Inventor
Emmerich I. Olah
By Schroeder, Hofgren,
Brady and Wegner Att'ys

Aug. 27, 1957  E. I. OLAH  2,804,169
CENTRIFUGAL SEPARATOR

Filed Oct. 11, 1954  3 Sheets-Sheet 2

Inventor
Emmerich I. Olah
By Schroeder, Hofgren,
Brady and Wagner Atty's

Aug. 27, 1957     E. I. OLAH     2,804,169
CENTRIFUGAL SEPARATOR

Filed Oct. 11, 1954     3 Sheets—Sheet 3

Inventor
Emmerich I. Olah
By Schroeder, Hofgren,
Brady and Wegner Atty's

United States Patent Office 2,804,169
Patented Aug. 27, 1957

2,804,169

CENTRIFUGAL SEPARATOR

Emmerich I. Olah, Waukesha, Wis., assignor to Cleaver-Brooks Company, a corporation of Wisconsin Application October 11, 1954, Serial No. 461,533

7 Claims. (Cl. 183—81)

This invention relates to a centrifugal-type separator for removing entrained particles from a flowing stream and more particularly for removing entrained water from steam.

The separator of this application may be used in a steam chest as more particularly described in Patent No. 2,666,499, issued January 19, 1954. In the patent referred to, the steam chest is described as the bonnet of an evaporator utilized to make potable water from seawater or other sources unsuitable for drinking water without purification. The separator of this invention is an improvement upon the separator disclosed in the referred to patent.

There are generally three criteria for a separator structure to be extremely effective in producing a dry steam which may be condensed to obtain a distillate of very low impurity content. In general, for the purpose of efficient operation, the pressure drop through the separator should be very low. There should be, secondly, free flow of both steam and separated water through the separator structure. Thirdly, the structure should be such that the diameter of the minimum sized particle which can be removed from the steam be quite small in order to remove substantially all of the impurities from the steam.

The structure of this invention is so arranged that there is eliminated to a great extent the passage of any dry steam past a surface upon which the water removed from the steam has been collected. In other words, it has eliminated the pick up of previously separated water which may thereafter be carried on into the outlet and eventually into the distillate, thus affecting its purity. Factors which influence the separation of entrained particles from the steam include the velocity of flow of steam past a separated particle as well as its mass upon which the force of gravity operates to take it toward a drain. The force acting upon the separated water particle should complement the force of gravity rather than be opposed to it. This factor becomes important in some installations, particularly where there is the possibility of pick up of previously separated water particles.

It is therefore the primary object of this invention to provide an improved separator structure of the centrifugal type which substantially eliminates the picking up of any particles of water once they are separated from the steam.

A further object is to provide a separator structure of the character described in which the forces of gravity and steam flow are complementary to direct the separated water to an outlet drain.

Another object of the invention is to provide a separator structure of the centrifugal type in which the surface upon which entrained particles are deposited is spaced from and opposite the path of flow of dry steam to an outlet from the separator body.

Other advantages, features and objects of the invention will be apparent from the following description of embodiments of the invention illustrated in the accompanying drawings in which:

Figure 5 is a view similar to Figure 3 of another form of the separator; and

Figure 6 is an enlarged fragmentary vertical sectional view of the structure shown in Figure 5.

Figure 1:
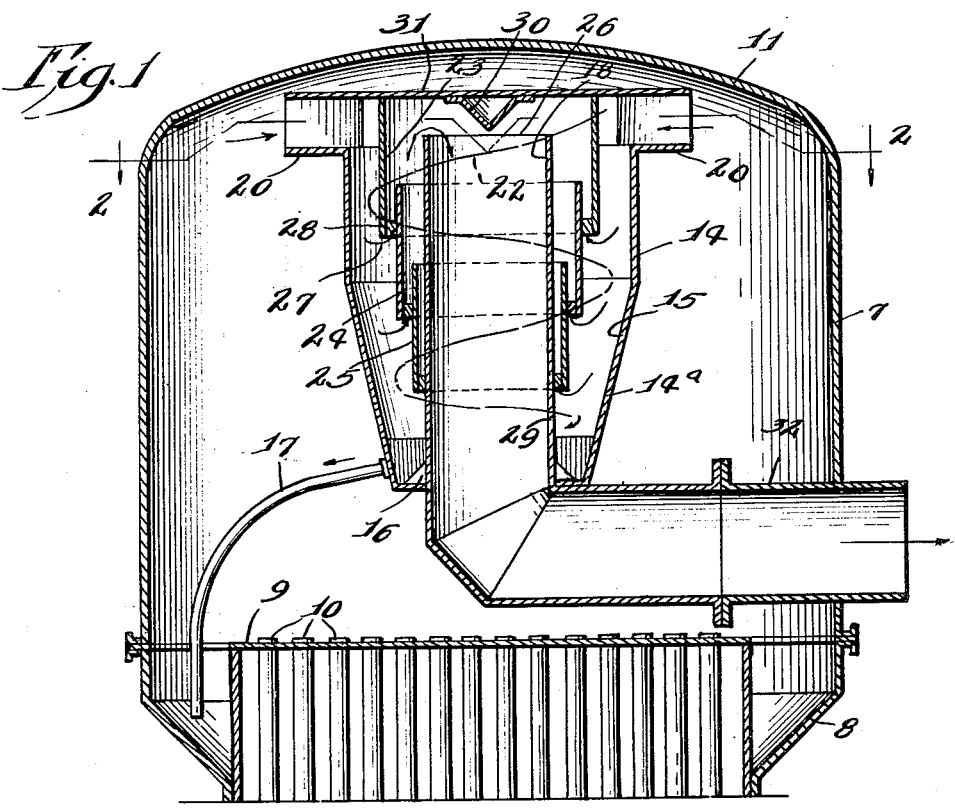
Figure 1 is a fragmentary sectional view taken through an evaporator body and separator embodying the present invention.

While this invention is susceptible of embodiment in many different forms, there is shown in the drawings and will herein be described in detail three specific embodiments, with the understanding that the present disclosure is to be considered as an exemplification of the principles of the invention and is not intended to limit the invention to the embodiments illustrated. The scope of the invention will be pointed out in the appended claims.

The separator of this invention may be utilized in the bonnet of a vapor compression still used for purifying any liquid and often employed for making potable drinking water from seawater. The still may be of the engine driven type wherein the heat for maintaining the flashing of the feed water into steam may be supplied from the engine. Other evaporators having a source of energy in the form of heat other than an engine may utilize the separator of this invention. The separator structure may be applicable to any operation in which it is desired to remove entrained particles from a stream of fluid in gaseous form.

The particular environment chosen for illustration of the invention includes the bonnet 7 of a vapor compression still which is mounted upon the shell 8 of the still which includes an upper tube sheet 9 in which tubes 10 are positioned. Feed water in a lower compartment (not shown) is flashed into vapor within the tubes 10 which vapor then rises into the bonnet 7. This bonnet is round in configuration and has a dome-shaped top 11 providing room for a separator structure between the tube sheet and dome 11. While three particular embodiments of the invention are illustrated in the drawings, they are similar in the major portion of their structures. Therefore, similar reference characters will be applied to the like parts. Each of the separator structures employs, in general, a main body or shell 14 to receive a swirling downwardly moving stream of steam. Entrained water is deposited upon the inner surface 15 of the shell and led to the bottom thereof to a collection well 16. A drain line 17 connects with the well 16 and conducts the collected water back to the hot well of the evaporator or to an outside disposal point.

The dry steam is conducted to the central portion of the separator shell and to an outlet 18 taking the dry steam from the central portion of the separator body and conducting it outside of the evaporator shell. A perforate member separates the outer portion of the separator shell 14 from the central portion wherein the outlet is located. This separating wall is provided with spaced passages for conducting the dry steam from the inside of the swirling stream to the outlet. These separating walls will be described in detail with each embodiment.

Figure 2:
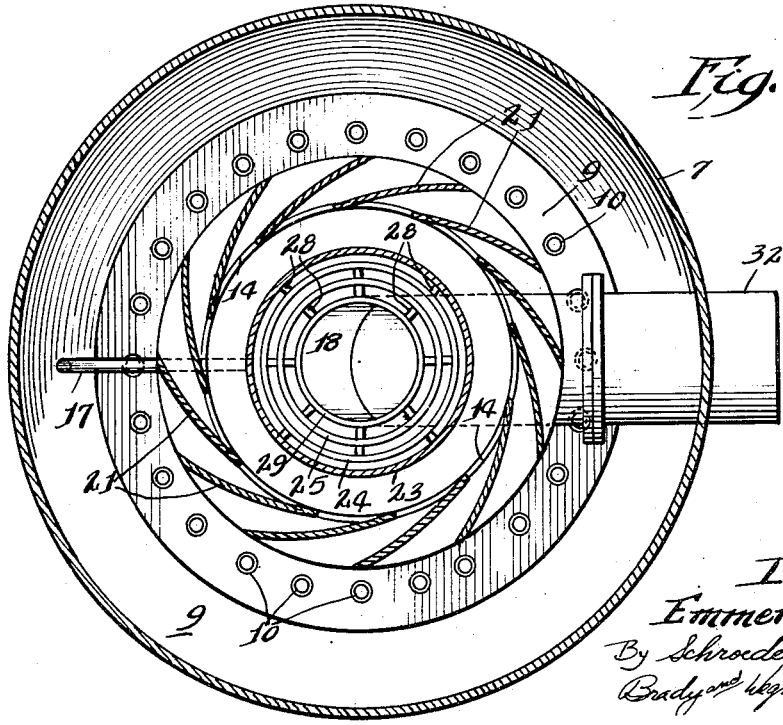
Figure 2 is a horizontal sectional view through the separator substantially along line 2—2 in Figure 1.

In Figures 1 and 2, it will be noted that the inlet 20 to the separator body is at the upper end. It comprises a plurality of vanes 21, more clearly seen in Figure 2, for directing the incoming steam in a tangential path following generally the spiral path indicated by the arrow 22. The steam carrying entrained moisture thus makes at least one, and preferably more than one, turn about the inner surface 15 of the shell. The outer space in which the wet steam travels is separated from the ountlet 18 by a plurality of overlapping annular plates 23, 24 and 25 which perform the dual function of providing passages on the inner side of the stream for drawing off dry steam and conducting it to the upper open end 26 of the outlet 18. Thus, between the plates 23 and 24 there is an annular passage for dry steam such that the dry steam may follow the arrow 27 as shown. At intervals, spacer blocks 28 may be provided between the plates to hold them in proper position. The plates diminish in size from the larger plate 23 adjacent the inlet 20 to the smaller plate 25 immediately about the outlet conduit 29 comprising the outlet 18. Thus, there are three passages for steam spaced in an upright direction from the inlet toward the bottom of the separator. In order to assist in the direction of the dry steam into the open end 26 of the conduit 29, a conical-shaped baffle 30 may be placed above the open end and attached to the closed top 31 of the separator body. A branch 32 of the outlet conduit may lead the steam outside of the evaporator.

Figure 4:
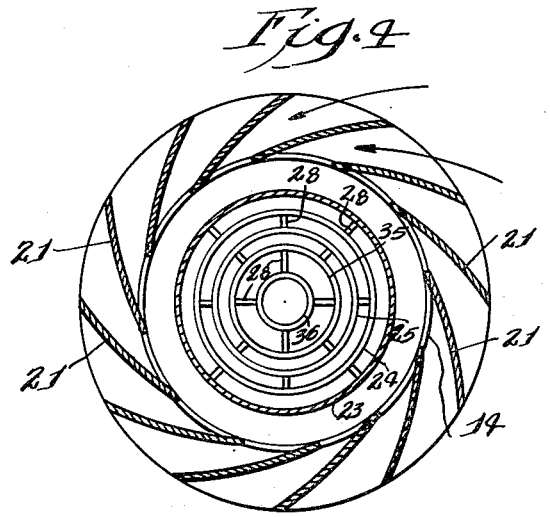
Figure 4 is a horizontal sectional view taken substantially along line 4—4 in Figure 3.

The overlapping plates which provide the passages for conducting the dry steam to the central portion of the separator diminish in size from the outlet toward the bottom of the separator body. In order that the space between the inner surface 15 of the shell of the separator be somewhat uniform over the length of the separator body, the lower portion 14a of the shell is formed in a cone shape to follow the diminished sizes of the separating plates. As noted in Figure 2 as well as Figure 4, the separator is generally round and has a vertical axis of symmetry.

Figure 3:
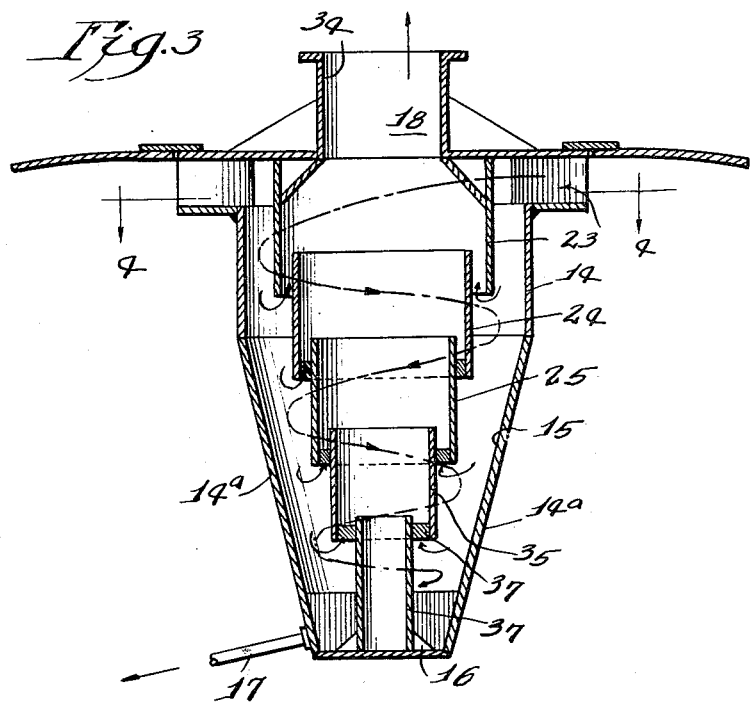
Figure 3 is a vertical sectional view through a separator and associated bonnet of an evaporator illustrating another form of the separator.

The embodiment of Figure 3 differs from that of Figure 1 in that the outlet 18 is formed by a conduit 34 passing upwardly through the separator in order to take the steam directly up from the central portion of the separator body. Thus, the conduit 29 illustrated in Figure 1 is eliminated and in its place the conduit 34 is utilized. The operation is substantially the same except that the dry steam upon once passing through the passages between the overlapped plates does not again change direction in order to enter the outlet conduit. An additional annular plate 35 is utilized in the embodiment shown in Figure 3 in order to form the passage between itself and the next larger plate 25. A blanked pipe section 36 may also be used to form an additional passage 37 adjacent the bottom of the separator.

In the embodiment of Figure 5, a unit is shown which may be utilized outside of an evaporator bonnet. Thus, the steam may be conducted by an inlet conduit 38 to an upper space 39 within the shell 14 of the evaporator whereupon the conical shaped baffle 40 will direct the steam downwardly to the vanes 21a which are similar in character to the vanes 21 shown in the embodiments of Figures 1 and 3. These vanes direct the steam in a downwardly swirling stream. An imaginary line 41 indicates the approximate line of sufficient separation and it will be noted that this line is completely inside of the line of the passages between the overlapping plates utilized to draw off the dry steam. Where the parts of this embodiment are similar to those illustrated in the other two embodiments, like reference numerals have been applied.

An important feature of the present separator is the structure permitting a cooperation of the flow of steam and the force of gravity upon any particle of moisture separated from the steam. It will be noted that the inlet is at the top of the separator and that the wet steam passes downwardly within the separator body. The force of attraction of the steam on any particle is thus in the direction in which the water must go to reach the outlet drain 17. This is a downward direction, even though it may in part be a helix following the surface 15. In addition, the force of gravity acting upon the mass of a separated droplet also pulls the droplet toward the drain 17. There is thus a cooperative contribution to an efficient separation because the steam does not tend to pick up a particle once it has been separated.

An additional important feature is in the drawing off of the dry steam from the inside of the swirling stream of gas. The passages provided between the overlapping plates draw the steam only from the inside of the helical path. This direction of flow is away from the wetted inner surface 15 of the separator body, thus drawing off steam from which entrained particles have been removed.

With the present separator, purities of the order of ½ part per million NaCl shown by total conducitivity reading may be obtained wherein the concentration of solution in the evaporator may be of the order of 50 to 70 thousand parts per million. The separator is not particularly disturbed by turbulent conditions since the inlet is at the extreme upper end of the separator body and the removal of droplets is quite complete. It should be noted in Figure 5 that the inlet conduit 38 may be placed in any position about the upper space 39 and thus could be placed in vertical alignment with the separator body 14 if desired. Other changes in the arrangements of parts may be made where conditions require so long as the principles of the invention are retained in the separator parts.

I claim:

1. A centrifugal steam separator adapted to operate within a steam chamber and comprising: a main body having an upright axis of symmetry and a closed bottom; a plurality of annular overlapping plates of generally similar length arranged in upright positions and concentric stepped relation with the outer plate being uppermost, said plates being mounted within the body separating the interior into an outer moist steam space and an inner dry steam space, said plates being spaced apart forming a plurality of annular upright passages having vertically spaced inlets for movement of dry steam from the moist steam space to the dry steam space; moist steam inlet means at the top of the body for introducing a downwardly swirling stream of moist steam into said outer space to deposit entrained particles upon the interior of the main body; drain means for removing separated water collected upon the bottom of the body; and dry steam outlet means connected with said inner space.

2. A centrifugal separator as specified in claim 1 wherein the outlet means includes a conduit extending into the body and open at its upper end, said annular plates being concentrically arranged about the conduit.

3. A centrifugal separator as specified in claim 1 wherein the largest of said overlapping plates is positioned adjacent the steam inlet means with the remaining plates spaced inwardly therefrom and said body is shaped to provide substantially uniform spacing between the body and each annular passage between the plates.

4. A centrifugal steam separator adapted to operate in a steam chamber, comprising: an upright housing including walls of generally round configuration and having a steam inlet at the upper end and a steam outlet connected with the central portion of the housing; a plurality of overlapping separator plates mounted within the housing in upright, concentric, spaced relation to each other and to the housing to provide a moist steam space between the housing and plates, said plates having their lower ends arranged in stepped relationship with the lower end of the outer of said plates uppermost so as to form a plurality of upright communicating passages between said space and the central portion of the housing; and a drain at the bottom of the housing communicating with said steam space for removing water separated from the moist steam, passage of said water to the drain being downwardly along the walls of the housing generally in the direction of passage of moist steam from the inlet to said communicating passages.

5. A centrifugal separator as specified in claim 4 wherein the overlapping plates are of diminishing size toward the bottom of the housing and the housing is cone shaped about the peripheries of the lower ends of the plates to provide an annular moist steam passage of diminishing radii, and substantially equal spacing between the housing and each passage between the separator plates.

6. A centrifugal steam separator adapted to operate within a steam chamber and comprising: a main body having an upright axis of symmetry, a closed bottom and a steam inlet at the top; vanes in the body adjacent the inlet to direct incoming moist steam in a downwardly swirling stream within the housing so that entrained droplets may be deposited on the inner surface of the housing; water drain means connected to the bottom of the housing to draw off water separated from the steam and passing downwardly on the housing surface; a dry steam outlet means arranged centrally of the housing for conducting dry steam axially out of the housing; and a plurality of annular overlapping separator plates about the dry steam outlet arranged in stepped relation with the larger diameter plate at the top and forming a partition between the swirling moist steam and the dry steam outlet, said plates being spaced apart to provide a plurality of annular upright draw-off passages spaced axially of the main body for taking dry steam progressively from the inside of the swirling stream and conducting the dry steam upwardly through said draw-off passages to the outlet.

7. A centrifugal steam separator for removing entrained moisture from steam, comprising, an outer housing having an upright axis of symmetry and walls of generally round configuration, a steam inlet at the upper end of the housing, a dry steam outlet leading from a central portion of the housing, a plurality of annular overlapping separator plates mounted within the housing in upright concentric spaced relation to each other and spaced from the housing walls to form a partition within the housing providing a substantially unobstructed moist steam space between the housing and the plates, said plates having their lower ends disposed in stepped relationship with the lower end of the outer plate uppermost so as to form a plurality of annular upright passages communicating with the moist steam space and the central portion of the housing for drawing off dry steam progressively from the interior of the swirling steam in the moist steam space, and a water drain means at the bottom of the housing communicating with the moist steam space for removing water separated from the moist steam, passage of said water to the drain being downwardly along the walls of the housing generally in the direction of passage of moist steam from the inlet to said upright passages.

References Cited in the file of this patent

UNITED STATES PATENTS

| | | |
|---|---|---|
| 408,907 | Woodbury | Aug. 13, 1889 |
| 575,561 | Bingham | Jan. 19, 1897 |
| 756,537 | Simonds | Apr. 5, 1904 |
| 1,239,456 | Brantingham et al. | Sept. 11, 1917 |
| 2,059,521 | Hawley | Nov. 3, 1936 |
| 2,216,389 | Hawley | Oct. 1, 1940 |
| 2,402,845 | Rodman | June 25, 1946 |
| 2,569,710 | Fitzpatrick | Oct. 2, 1951 |
| 2,607,438 | Bailey | Aug. 19, 1952 |
| 2,666,499 | Loebel | Jan. 19, 1954 |

FOREIGN PATENTS

| | | |
|---|---|---|
| 151,464 | Germany | May 13, 1904 |
| 646,696 | Germany | June 19, 1937 |